United States Patent [19]

Kimball

[11] 4,092,075
[45] May 30, 1978

[54] LINE ATTACHMENT DEVICE

[76] Inventor: James F. Kimball, Star Rte. 2, Box 466, Dexter, Oreg. 97431

[21] Appl. No.: 686,168

[22] Filed: May 13, 1976

[51] Int. Cl.² .................. F16C 11/00; F16G 11/00
[52] U.S. Cl. ........................... 403/72; 24/129 B; 24/115 J; 24/18
[58] Field of Search ............ 24/115 J, 74 R, 129 B, 24/129 R, 81 CR, 18, 129 A; 403/245, 72; 43/42.74; 105/473; 280/179 A; 224/42.1 B; 211/119.11, 119.12, 119.13; 248/328; 114/108, 114, 115; 135/15 CF

[56] References Cited

U.S. PATENT DOCUMENTS

| 678,866 | 7/1901 | Duvall | 24/129 B |
|---|---|---|---|
| 923,575 | 6/1909 | Planett | 24/129 D |
| 980,136 | 12/1910 | Walden | 24/18 |
| 1,253,972 | 1/1918 | Hoffman | 24/18 |
| 1,365,493 | 1/1921 | Hedger | 24/74 R |
| 1,383,665 | 7/1921 | Rohan | 24/129 B |
| 1,386,788 | 8/1921 | Levit | 24/129 B |
| 2,309,971 | 2/1943 | McLarn | 24/129 B |
| 2,345,890 | 4/1944 | Daniels | 24/129 |

FOREIGN PATENT DOCUMENTS 20,752 10/1901 United Kingdom ............ 24/129 B

Primary Examiner—Bernard A. Gelak
Attorney, Agent, or Firm—James D. Givnan, Jr.

[57] ABSTRACT

A device for interconnecting tie-down ropes permitting the securement of rope segments in various angular relationships to one another. First and second members of the device each define multiple inset areas having an irregular surface for embedded engagement with the rope when the latter is tensioned. Pivot means couple the members to one another to permit the interconnecting of ropes throughout a wide range of angular relationships to enable securement of a load or load cover.

2 Claims, 2 Drawing Figures

LINE ATTACHMENT DEVICE

BACKGROUND OF THE INVENTION

The present invention concerns generally a device in the nature of a tie-down fitting facilitating the securement of a line to a vehicle truck box or the like.

Covers applied over cargoes for the protection of same from the elements are normally secured by lengths of rope which are entrained about hooks or eyes secured to the truck box. Provision is made for the lacing of a rope or line back and forth across a truck box which leaves substantial areas of the cover unsecured against the air stream. The continuous action of the air stream on a cover often results in the loosening and flapping of same. Another drawback to known tie-down practices is that the lengthy rope must be laced back and forth about fittings requiring the rope to be thrown back and forth across the cover and load. Efforts to provide elastic tie-downs are of some benefit but do not fully remedy the problem.

SUMMARY OF THE PRESENT INVENTION

The present line attaching device includes members, each of which define multiple, rope gripping recesses which permit secure engagement of the device at selected points along a rope segment and attachment of a second rope segment.

One form of the invention includes pivotally interconnected members, each adapted for retentive engagement with a rope segment. The members are positionable relative one another to enable the securement of one rope by another rope regardless of the angular relationship of the ropes. Each of said members defines rope engaging recesses configured to prevent rope slippage. Said members may be used in conjunction with tie-down hooks to secure rope segments against slippage which otherwise would require the tying of individual knots about the hook.

Important objects of the present tie-down device include: the provision of a tie-down device capable of interconnecting multiple rope segments; the provision of a tie-down device capable of securing a rope segment to a second rope segment regardless of the angular relationship of the segments; the provision of a tie-down device having separable members enabling use of the members separately; and the provision of a tie-down device lending itself to low-cost production methods and hence a moderate price.

BRIEF DESCRIPTION OF THE DRAWING

In the accompanying drawing.

DETAILED DESCRIPTION OF THE PREFERRED EMBODIMENT

Figure 1:
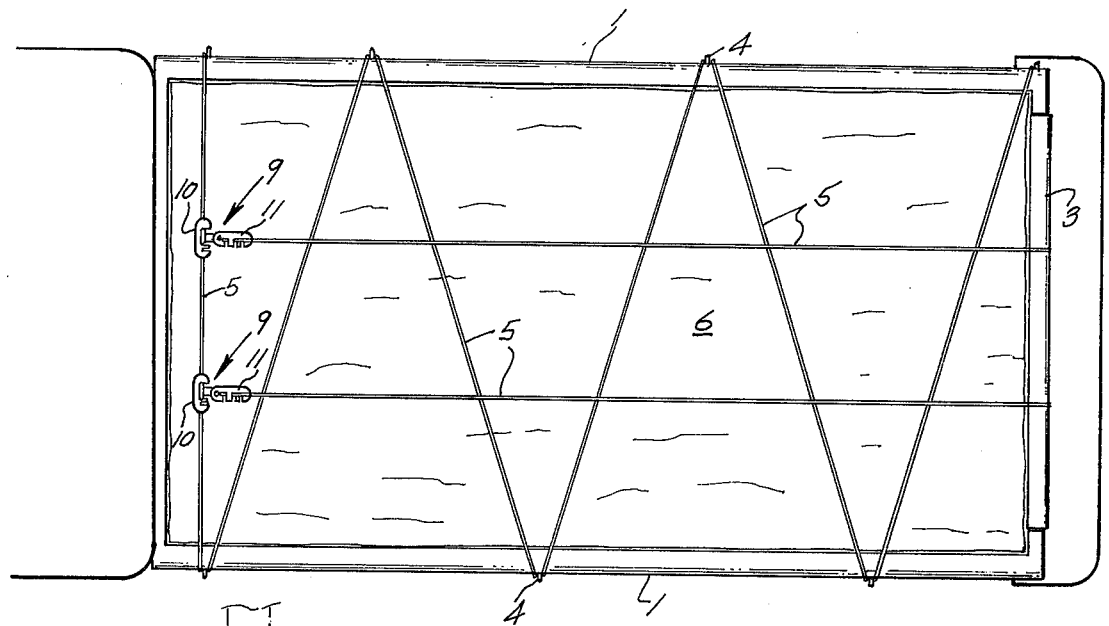
FIG. 1 is a plan view of a loaded truck box with a cover secured in place by ropes and the present device.

With continuing reference to the accompanying drawing wherein applied reference numerals indicate parts similarly identified in the following specification, the reference numeral 1 indicates the exterior side walls of a truck box closed by tail gate 3. Typically, truck boxes as shown, or other types of load carrying enclosures, are fitted with hooks 4 for the purpose of securing tie-down ropes. While the present invention is shown in conjunction with the box of a pickup truck, it is to be understood that the device is in no way limited to such use.

Secured in place by means of hooks 4 is a tie-down rope or cord 5 which normally is laced across the truck box (or other load carrying enclosure) to confine a load and cover 6 against displacement by the air stream.

Indicated generally at 9 is the present tie-down device which permits interconnected rope segments to be randomly entrained over the load and cover. With particular attention to FIGS. 2 and 3, each device 9 includes first and second members 10 and 11 which may be formed or punched from a durable synthetic material such as a high-impact plastic. First member 10 defines rope receiving inset areas at 12, 13 and 14. Shoulders at 12A, 13A and 14A are provided for rope engaging purposes and prevent axial passage of the rope segment when entrained through at least two of said inset areas. The shoulders 12A, 13A and 14A are disposed so as to embed themselves into the entrained rope segment thereby locking the same against axial movement. An arm at 15 is integral with the first member 10 and provides a supporting surface for a second member at 11. A fastener assembly at 16 extends through aligned openings 17 and 18 to pivotally interconnect the first and second members. The first member additionally defines an opening 19 intended for the alternate reception of a tie-down hook 4 while a remaining opening at 20 enables the attachment of additional members such as that shown at 11 for securing additional ropes.

Figure 2:
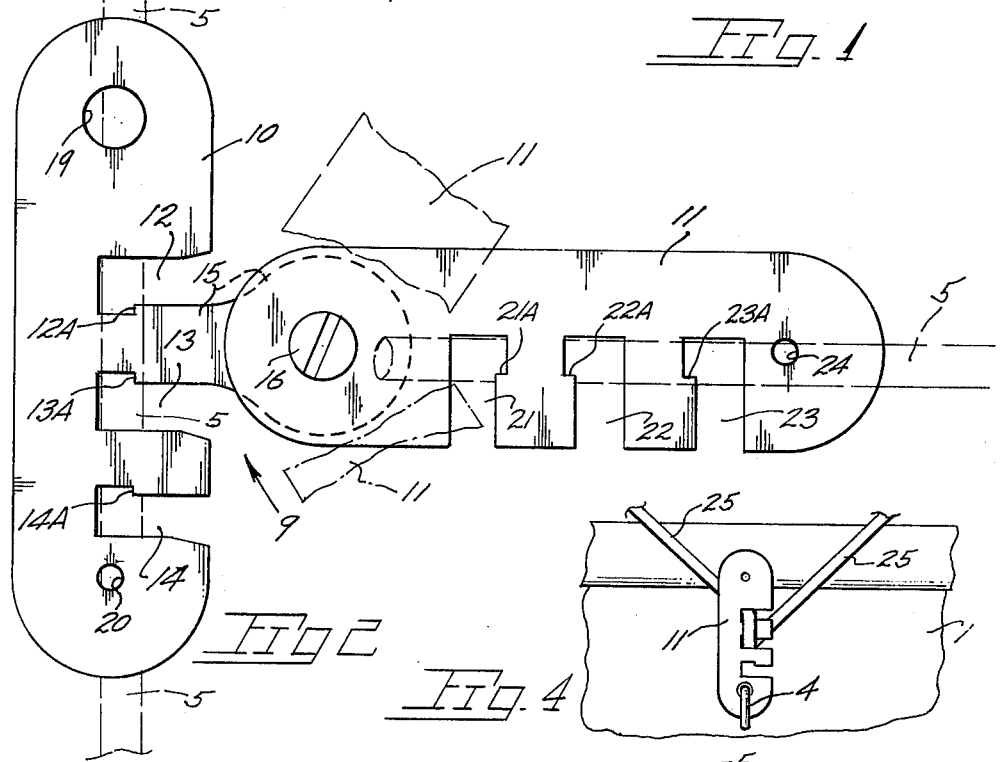
FIG. 2 is a plan view of the device.
Figure 3:
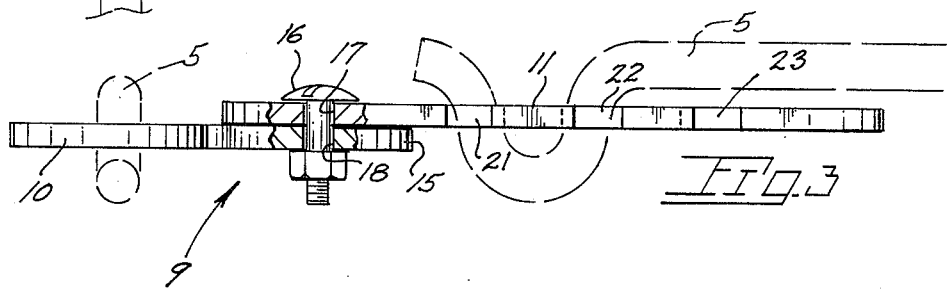
FIG. 3 is a front elevational view of FIG. 2.

With attention now to the second member indicated at 11, the same defines inset areas at 21, 22 and 23 with the member being shouldered at 21A, 22A and 23A for securing a rope end segment in the manner mentioned earlier in conjunction with member 10. Obviously, the shoulder configuration may vary for use with different ropes. Importantly, however, is the irregular edge against which a rope is tensioned which edge at least partially is embedded into the rope. Member 11 additionally defines an opening 24 which may receive a tie-down hook when used other than as shown in FIG. 2. While second member 11 is shown normally disposed to first member 10, it will be readily apparent that second member 11 may be positioned about the axis of fastener assembly 16 to interconnect rope segments in various angular relationships to one another. Additionally, an additional second member 11 may be coupled to first member 10 by fastener assembly 16, thereby providing for the interconnecting of three or more rope segments. Such an additional member is shown in dashed lines in FIG. 2.

Figure 4:
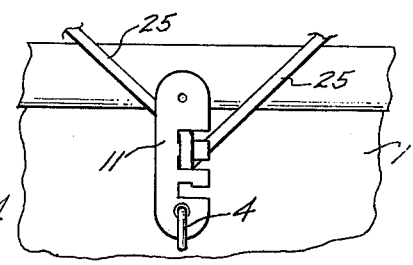
FIG. 4 is an elevational view of the present device shown in attachment with a truck tie-down hook.

With attention to FIG. 4, member 11 has been detached from first member 10 and placed in hook engagement with a box tie-down hook 4. A length of line 25 is entrained through inset areas 21 and 22 or 23, depending on the degree of rope flexibility, to secure the rope without the tying of a knot in same about hook 4. As tie-down ropes are necessarily long, the tying of a knot at each tie-down hook becomes a time consuming task. Extremely stiff ropes will be entrained through the outermost inset areas of each member. The inherent resiliency of the rope fibre will urge the rope surface into forceful engagement with the irregular, shouldered edges of the pair of inset areas used.

While I have shown but one embodiment of the invention, it will be apparent to those skilled in the art that the invention may be embodied still otherwise without departing from the spirit and scope of the invention.

Having thus described the invention, what is desired to be claimed and secured under a Letters Patent is:

1. A line attachment device for use in securing tie-down ropes, said device comprising, first and second elongated members partially overlapped;

each of said members defining laterally extending inset areas through which a rope segment may be entrained, said members having irregular rope engaging edges partially defining said inset areas for embedded engagement with an entrained rope segment, and said first member including an arm at substantially a mid-portion thereof and providing a supporting surface for the said second member, and pivot means extending perpendicularly through and interconnecting an end of said second member to the overlapped arm whereby said members may freely pivot to accommodate a wide range of angular relationships between the attached rope segments, said pivot means being detachable from said members permitting individual use of a member to secure an entrained rope segment.

2. The line attachment claimed in claim 1 additionally including a third member similar in configuration to said first and second members, said pivot means adapted to attach said third member to said first and second members for movement of the members about a common axis.

* * * * *